(12) United States Patent
Auer

(10) Patent No.: US 9,980,467 B2
(45) Date of Patent: May 29, 2018

(54) DATA NETWORK FOR MONITORING ANIMALS

(71) Applicant: SMARTBOW GMBH, Weibern (AT)

(72) Inventor: Wolfgang Auer, Weibern (AT)

(73) Assignee: SMARTBOW GMBH, Weibern (AT)

( * ) Notice: Subject to any disclaimer, the term of this patent is extended or adjusted under 35 U.S.C. 154(b) by 0 days. days.

(21) Appl. No.: 15/314,226

(22) PCT Filed: Jun. 5, 2015

(86) PCT No.: PCT/AT2015/000084
§ 371 (c)(1),
(2) Date: Nov. 28, 2016

(87) PCT Pub. No.: WO2015/184479
PCT Pub. Date: Dec. 10, 2015

(65) Prior Publication Data
US 2017/0099810 A1    Apr. 13, 2017

(30) Foreign Application Priority Data

Jun. 5, 2014  (AT) .................................. A 447/2014
Sep. 22, 2014  (AT) .................................. A 718/2014

(51) Int. Cl.
*G08B 23/00*    (2006.01)
*A01K 29/00*    (2006.01)
(Continued)

(52) U.S. Cl.
CPC .......... *A01K 29/005* (2013.01); *A01K 11/004* (2013.01); *A01K 11/006* (2013.01);
(Continued)

(58) Field of Classification Search
CPC .. A01K 11/004; A01K 11/006; A01K 29/005; A61D 17/002; A61D 17/008; H04L 67/12
See application file for complete search history.

(56) References Cited

U.S. PATENT DOCUMENTS 4,591,854 A    5/1986  Robinson
5,914,701 A    6/1999  Gersheneld et al.
(Continued)

FOREIGN PATENT DOCUMENTS

DE    3702465 A1    8/1988
DE    69623115 T2    5/2003
(Continued)

OTHER PUBLICATIONS

International Search Report for PCT/AT2015/000084, ISA/EP, Rijswijk, NL, dated Oct. 15, 2015.
(Continued)

Primary Examiner — Brian Zimmerman
Assistant Examiner — Kevin Lau
(74) Attorney, Agent, or Firm — Harness, Dickey & Pierce, P.L.C.

(57) ABSTRACT

The invention relates to a data network for automatically monitoring voluntary behaviors of individual animals of an animal herd. The individual animals of the animal herd each have a node of the data network. A further node is attached at a location which an animal preferably approaches in the course of a behavior to be monitored. In the event that the animal approaches the node, communication occurs between the nodes, in which communication one node is identified by the other node and a central data-processing system is informed that the two nodes have come into contact. The communication between the two nodes occurs by means of the transfer of electrical signals in a closed electrical alternating-current circuit, which also passes, among other things, through the body of the animal as an electrical conductor.

15 Claims, 1 Drawing Sheet

(51) Int. Cl.
*A01K 11/00* (2006.01)
*A61D 17/00* (2006.01)
*H04L 29/08* (2006.01)

(52) U.S. Cl.
CPC ......... *A61D 17/002* (2013.01); *A61D 17/008* (2013.01); *H04L 67/12* (2013.01)

(56) References Cited

U.S. PATENT DOCUMENTS

| | | | | |
|---|---|---|---|---|
| 7,878,149 | B2* | 2/2011 | Voronin | A61D 17/002 119/174 |
| 2005/0209526 | A1* | 9/2005 | Ingley, III | A61B 5/00 600/529 |
| 2010/0256948 | A1* | 10/2010 | Wright | G06Q 10/087 702/150 |
| 2011/0218391 | A1* | 9/2011 | Signorini | A61B 17/43 600/35 |
| 2011/0227856 | A1* | 9/2011 | Corroy | H04B 13/005 345/173 |
| 2012/0234245 | A1 | 9/2012 | Rajkondawar et al. | |
| 2012/0238912 | A1* | 9/2012 | Rajkondawar | A01K 29/005 600/588 |
| 2015/0339501 | A1 | 11/2015 | Auer | |
| 2015/0358409 | A1* | 12/2015 | Ouzounov | A61B 5/0028 709/208 |
| 2017/0024542 | A1* | 1/2017 | Visweswara | G06F 19/3462 |

FOREIGN PATENT DOCUMENTS

| | | |
|---|---|---|
| EP | 0109184 A2 | 5/1984 |
| JP | 2011-072452 A | 4/2011 |
| WO | WO-2013188895 A2 | 12/2013 |
| WO | WO-2014/019791 A1 | 2/2014 |

OTHER PUBLICATIONS

Written Opinion of the ISA for PCT/AT2015/000084, ISA/EP, Rijswijk, NL, dated Oct. 15, 2015.

* cited by examiner

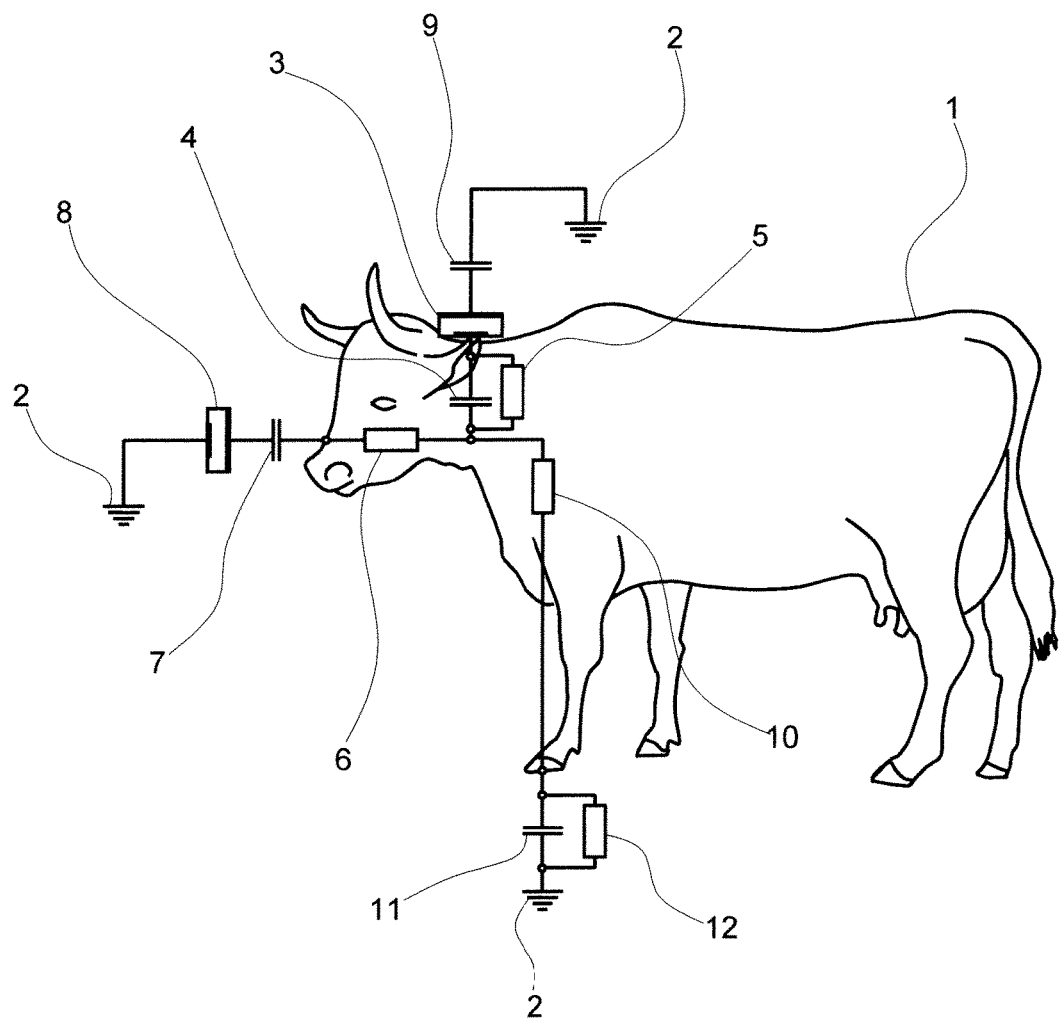

DATA NETWORK FOR MONITORING ANIMALS

CROSS-REFERENCE TO RELATED APPLICATIONS

This application is a 371 U.S. National Stage of International Application No. PCT/AT2015/000084, filed Jun. 5, 2015, which claims the benefit of and priority to Austrian Patent Applications Nos. A 447/2014, filed Jun. 5, 2014 and A 718/2014, filed Sep. 22, 2014. The entire disclosures of the above applications are incorporated herein by reference.

The invention relates to a data network for automatically monitoring voluntary behaviors of individual animals in an animal herd.

If livestock such as cattle or breeding pigs are kept in relatively large herds, in particular, some behaviors of the animals are automatically monitored and actions are derived on the basis of knowledge from said monitoring. Examples are: the movement behavior of female cattle or pigs is monitored and evaluated in order to detect estrus. The frequency with which feeding stations are visited is monitored in order to be able to draw conclusions on the health and in order to optimize the amount and composition of feed. It is automatically recorded when a cow visits a milking parlor in order to be able to find out how much milk is provided by the respective animal in order to derive further required actions therefrom.

WO 2014/019791 A1 describes a method for automatically detecting when cows, for example, are in estrus. The animals are automatically monitored with regard to movement activity and proximity to other animals, and increased movement activity with an increased proximity to other animals at the same time is automatically deemed to be an indication that an animal is in estrus. The system possibly generates an output. Continuous filming with automatic image processing running in a parallel manner and optical pattern recognition are proposed as monitoring means, as is the use of radio-based identification and sensor technologies such as RFID transponders and RFID readers, in particular.

DE 37 02 465 A1 already proposed in 1988 the practice of providing cows with an identification means and providing a sensor at the entrance to a milking area, which sensor can read the identification means when a cow approaches. A data processing system which evaluates the sensor results decides, on the basis of adjustable specifications, whether or not the cow is allowed into the milking parlor at the given time, and a controllable gate is accordingly opened or is not opened. The identification means and the sensor are not described in any more detail; nowadays, in the case of such applications, RFID transponders are primarily considered as an identification feature on the cows and an RFID reader is considered as a sensor at the entrance to the milking area.

US 2012234245 A1 proposes the practice of identifying cows in the individual stalls of a serial milking parlor by means of radio location. For this purpose, each of the cows wears a node of the radio location system, which node also has a unique identifier in the system. A plurality of nodes are fixedly mounted in a known position close to the milking parlor. The position of the movable node is calculated from the measurable propagation times or the measurable differences between the propagation times of the signals interchanged between nodes of a known fixed position and a movable node on a cow and that stall of the serial milking parlor in which the cow wearing the movable node is situated is therefore inferred.

WO 2013/188895 describes a method for recording data relating to a medical treatment on an animal, such as typically the administration of an injection. Both the animal and the treatment apparatus (injection device) are each equipped with a transmitting apparatus in which the identity of the animal or of the treatment apparatus is recorded by means of an identifier. A series of data transmissions is initiated when carrying out the treatment, which data transmissions are used to communicate these identities, together with the notification that a treatment has taken place at the given time, to a central data processing system. As a result of a first data transmission between the individual transmitting apparatuses, it is also determined in a defined manner that they interact in a common treatment. A relevant data transmission is initiated when the treatment device is in direct contact with the animal, the animal's body being used as the transmission path.

For such data transmission during which electrical signals signifying information are also transmitted via the body of living beings, the term "body-coupled communication", abbreviated to "BCC", is used in some places and is furthermore also used in this document. The term "body area network", abbreviated to "BAN", is also often similarly used. A significant feature is that a transmitter, the body of a human or animal, and a receiver are connected in series in a closed electrical AC circuit, the transmitter and the receiver each having two poles and, in at least one of the two devices, one pole being a connection of a capacitance (that is to say an electrical capacitor), the second connection of which is ground, that is to say the environment, and the second connection of the transmitter or receiver being present on the human or animal body either directly—that is to say electrically connected—or via a further capacitance. The base frequency of the AC circuit is normally of the order of magnitude of 10 kHz to 1 MHz.

A known exemplary embodiment relates to the locking of an automobile door which is equipped to this effect, which locking can be triggered by virtue of a person, who carries an electronic device as a key which emits an identification via the person's body, touching the automobile.

EP 109184 A2 already published the proposal in 1984 (priority 1982) of using BCC (see the above explanation for the meaning) for access control to devices. For this purpose, a person wears a BCC-enabled transmitting device. As soon as the person touches the device to which access is controlled and which comprises a BCC-enabled receiver, an identification code is transmitted to the receiver. The code is checked and access to the device is enabled if the code signifies a permissible key. The transmitting device to be worn on the person's body may be a specially equipped wristwatch, for example. A contact of said wristwatch rests on the skin of the person wearing it. A second, extensive contact area is situated on the outside of the watch strap; it forms one electrode of a capacitor, for which the second electrode is ground and for which the associated dielectric is the ambient air. One electrode of the receiving device is connected to ground. A second electrode is that area which must be touched by that person who is seeking access to the device for the purpose of access control. As soon as the person touches this electrode, a circuit, in which the transmitter, said capacitor, ground, the receiver and the person's body are connected in series, is closed, and the data transmission by means of coded current flow which is needed to check the identity can start.

DE 696 23 115 T2 (priority 1995) improves the principle for BCC known from EP 109184 A2 to the effect that neither the transmitter nor the receiver needs a galvanic conductive electrical connection to that body of a person or animal which is part of the circuit, but rather the relevant electrical connection can also be a capacitive electrical resistor, that is to say said body is the electrode of an electrical capacitor for which the second electrode is electrically connected to the transmitter or receiver (or is part of it). In order to establish the connection, it therefore suffices for an electrical displacement current to flow in the distance area, that is to say in the dielectric between the transmitter or the receiver, on the one hand, and the body of the human or animal, on the other hand; an electrical current based on charge carriers need not necessarily flow.

The object on which the invention is based is to make it possible to automatically monitor and document voluntary behaviors of animals in an animal herd in a more exact and more reliable manner than was previously possible with the described methods in strict compliance with economy.

In order to achieve the object, it is proposed to use an electronic communication network having a plurality of nodes and a data processing system, the individual nodes which may be transmitters and/or receivers having a unique identification signature, a node being fitted to an animal to be monitored, a further node being fitted to one or more other bodies which are touched and/or approached by the animal during voluntary behaviors to be monitored, the two nodes being designed to communicate with one another by means of BCC via the body of the animal to be monitored as part of the circuit as soon as the animal has closely approached the second node, one of the two nodes, in the event of communication with the other node, transmitting the identification signature to the other node, the second node transmitting both identification signatures to a data processing system.

BCC-enabled nodes can be provided in a very cost-effective manner. The use of BCC means that the presence of an animal, which is equipped with a BCC-enabled node, at another body, which is likewise equipped with a BCC-enabled body, can be determined in a very reliable, clear, and interference-free manner. The second body may be a device, for example a trough, an automatic feeder, a gate or a milking robot, or else another animal.

The invention is explained further using a sketch:

FIG. 1: shows, using the example of a cow as the animal to be monitored, an equivalent circuit diagram for part of a data network according to the invention.

In the equivalent circuit diagram according to FIG. 1 (like in every equivalent circuit diagram in principle), some complex real electrical circuit elements have been replaced with ideal electrical circuit elements, namely ideal capacitances and ideal non-reactive resistors, which, although being a simplification in comparison with reality, allows and facilitates the knowledge essential to understanding the function.

Using the example according to FIG. 1, the cow 1 is in an environment which is symbolized as ground 2 in the sense of electrical circuitry. The cow 1 wears an ear tag 3 which is a node in the data network according to the invention and may be a transmitter and a receiver in the example described here. In this example, a further node 8 of the data network is fixedly mounted in a stationary manner in the environment, for example on a trough for the cow 1.

The ear tag 3 has two connection electrodes. A first connection electrode is present on the cow 1 and constitutes a direct electrical connection between the body of the cow 1 and a circuit in the ear tag 3. The impedance at the contact point between the cow 1 and the ear tag 3 is represented as a parallel circuit of a capacitance 4 with a non-reactive resistor 5 in the equivalent circuit diagram. A further non-reactive resistor 6 symbolizes the line resistance in the body of the cow 1 toward that surface region with which the cow 1 faces the second node 8. The surface of the cow 1 and one of the two connection electrodes of the node are, in the sense of electrical circuitry, electrodes of a capacitance 7 for which the air between the cow 1 and the node 8 substantially forms the dielectric. The second electrode of the node 8 is connected to ground 2.

The second electrode of the ear tag 3 (or more precisely: "the circuit contained in the ear tag 3") is on that side of the ear tag 3 which faces away from the cow 1 and is as extensive as possible. It forms an electrode of the capacitance 9 which is between the ear tag 3 and ground 2. The dielectric of this capacitance is again substantially air.

Current flow which is introduced into the body of the cow 1 as intended by one of the nodes 3, 8 will unfortunately not completely flow to ground via the respective other node 8, 3, but rather a considerable part of the current flow also flows past the respective second node via a line branch. This line branch is represented by the non-reactive resistors 10, 12 and the capacitance 11. In this case, the resistor 10 signifies the non-reactive resistance during current flow in the body of the cow 1. The capacitance 11 and the non-reactive resistor 12 represent the impedance in the region between the cow 1 and ground 2.

In a further improvement level of the equivalent circuit diagram, a non-reactive resistor can also be assumed in parallel with the capacitance 7, which non-reactive resistor represents the contact resistance when the cow 1 directly touches the electrode on the node 8.

The practical operation according to the invention can take place according to the following examples:

EXAMPLE 1 (Drinking Monitoring)

Node 8 is fitted to a trough. It is a transmitter in the network. As the transmitter, it constantly applies an AC voltage signal between its two electrodes at short repeating intervals, for example every 0.1 seconds for 0.01 seconds. The frequency of the AC voltage is that intended for data transmission by means of BCC, for example 20 kHz; the maximum amplitude of the voltage is 0.5 V, for example. In the 0.1 seconds in each case, the amplitude of the voltage fluctuates according to a binary code and therefore repeatedly signals a characteristic number which constitutes an identification signature of the node 8.

The ear tag 3 is switched to reception in the frequency range intended for BCC. It is therefore a voltage sensor which measures whether voltage signals arrive in the relevant frequency band, the amplitude of which voltage signals is above a predefined threshold value, for example 2 µV.

As long as the cow 1 is not in the vicinity of the node 8, the ear tag 3 cannot detect an appropriately strong voltage signal. The cow 1 is considered to be remote from the node 8.

As soon as the cow 1 approaches the node 8, the capacitance increases, as a result of which electrical current is increasingly injected into the body of the cow 1, as a result of which the voltage to be measured at the ear tag 3 increases. As soon as the distance between the cow 1 and the node 8 is less than 10 cm, for example, the voltage to be measured at the ear tag 3 has increased to such an extent that said threshold value is exceeded. The ear tag 3 switches to decoding of the binary signal transmitted with the voltage and recognizes the identification signature of the node 8. (If the cow 1 directly touches the contact on the node 8, the capacitor 7 is bridged and current is only very strongly injected into the body of the cow from the node 8.)

As soon as the ear tag 3 was able to regularly decode the identification signature of the node 8 without interruption, the ear tag 3 sets up a radio connection to a central data processing system belonging to the data network and transmits both its own identification signature and the identification signature of the node 8 to the data processing system.

The central data processing system therefore registers that, at the given time, the cow 1 wearing the ear tag 3 is at that trough at which the node 8 is situated.

As long as the cow 1 is at the trough having the node 8, the transmission from the ear tag 3 to the central data processing system is repeated at stipulated intervals of time, as a result of which the data processing system also registers how long the cow 1 is at the relevant trough for.

Over the course of time, the data processing system creates statistics relating to how often and how long for the cow 1 is at the trough 8. On the basis of rules stored using data technology, the data processing system then outputs a message if the cow 1 was at the trough too much or too little over a certain period since this can be interpreted as a reason for concern over the state of health of the cow. If a plurality of troughs in a field are each equipped with an individual node of the data network, it is also possible to detect how the cow 1 wanders between the individual troughs and which troughs are preferred or avoided.

Said radio connection between the ear tag 3 and the central data processing system does not need to be effected at the frequency of BCC and does not need to be effected by means of BCC at all. It is possible to use a conventional wireless radio standard, for example. This is appropriate, in particular, when the ear tag is also designed anyway for functions other than those discussed here and is also designed to communicate with a central data processing system by radio. A typical one of these other functions of an ear tag is to be a node in a radio location system which is used to be able to determine the location of the cow 1 in a field at any time.

In practical reality, the data network will comprise not only two nodes, but rather many cows having ear tags will be part of the data network and there will be a plurality of stationary nodes at troughs, feeding stations, milking parlors, gates etc., with the result that many behaviors of many animals are monitored. If the situation can occur in which a cow 1, in addition to the node worn by the cow itself as the ear tag 3, also comes into contact with more than one single further node or enters the close proximity thereof, measures need to be provided in order to be able to distinguish between the different nodes.

For example, it is possible to establish that the nodes transmit at different frequencies by means of BCC and that the receiving node receives and decodes in a frequency-selective manner, with the result that it can simultaneously determine contact with a plurality of different nodes and can identify the other nodes.

However, it is also possible to provide and to program on receiving nodes that, when receiving from a plurality of transmitting nodes at the same time by means of BCC, the sensitivity is reduced, that is to say the gain of the received signals before decoding is reduced, until only more signals are decoded by a single node, namely that which receives the highest signal strength. A clear result is therefore obtained at least according to clear rules.

However, an individual time window may also be assigned, for example, to each node in the network within a temporal clock which applies to all nodes, during which time window only this one node respectively transmits, with the result that the situation is therefore avoided from the outset in which a plurality of nodes transmit at the same time and signal sequences which cannot be decoded could therefore be received. It is therefore also possible to achieve the situation in which a node can determine the simultaneous contact with other nodes and can identify the other nodes.

On account of the temporal clock which applies to all nodes, the last-mentioned method provides the additional advantage that, when a second node receives a signal from a first node, the propagation time of the signal transmission can then be determined by comparing the time of reception with the time of emission of the signal which is known from the common clock. It is therefore possible to detect, for example, whether the body region with which an animal approaches a node is the head of the animal or rather the rear part of the animal. In addition, it is therefore also possible to detect a string of animals if a plurality of animals touch one another in the throng and one of the animals enters the vicinity of a stationary node.

EXAMPLE 2 (Milking Monitoring)

Node 8 according to FIG. 1 is fitted to teat cups of milking robots. In this case, the transmission power based on BCC is set to be so low that, only when a teat cup equipped with a node 8 actually rests on a teat of a cow 1, is it detected at the ear tag 3 that the connection to the node 8 exists.

In this manner, it is possible to automatically monitor very clearly and very directly when which cow is milked by which milking robot or by means of which teat cup of a milking robot for how long. The requirement for different further actions can be automatically detected on the basis of these data.

For example, the milking robot can carry out pre-milking for a short time on the teat, can then examine the milk which has been milked (for example optically with regard to coloration or flakes) and can then decide whether or not the milk contains an indication of a disorder and, on the basis thereof, can either carry out milking or cannot carry out milking and can issue a message, the message also comprising the notification of the identity of the affected teat cup and protecting the milk sample.

EXAMPLE 3 (Access Control to the Milking Parlor)

Node 8 is fitted to a controllable gate which forms the entrance to a milking parlor. If a cow 1 wishes to enter the milking parlor, it approaches the node 8 so closely that, as already described using example 1, node 8 is detected by the ear tag 3 of the cow 1 and the central data processing system is informed of this. On the basis of specifications and data which have been programmed in and are already available in the data processing system with regard to the cow, the central data processing system opens the gate and therefore enables milking or keeps the gate closed and therefore denies milking (—and possibly encourages or urges the cow to leave the gate area by means of a relevant measure).

This access control method is considerably more cost-effective with considerably more reliably correct detection results than the identification using RFID sensors which are fitted to gates etc. and correspond to RFID tags on animals.

EXAMPLE 4 (Estrus Detection)

All cattle in a herd are equipped with ear tags 3 which are each nodes of the data network and are both transmitters and receivers according to the BCC principle and switch back and forth between the transmitting state and the ready-to-receive state at different frequencies (—which do not have any integer ratios with respect to one another). A cow makes body contact with a further cow, for example by virtue of its chin region rubbing on the back of the further cow. According to the sequence described in example 1, this contact—and also its duration—is detected by means of that ear tag of one of the two cows which is currently ready to receive, and the contact of those two nodes of the data network which constitute the two ear tags of the two cows is recorded by the central data processing system. The frequency of contact between the cows is therefore recorded and can be monitored in the data processing system. In this case, the data processing system can record a statistical contact frequency for each unit of time and can track its progress. Clusters of body contact between the cow and other cattle can therefore be quickly detected; they are a strong indication of the fact that the cow is in estrus. The cow can therefore be monitored in order to note the optimal time for insemination in good time. If appropriate, the data processing system can issue a message or the cow can receive access, at a controllable gate which is monitored according to the invention by the data processing system, to an area in which the cows which are in estrus and are to be inseminated are collected.

The detection of whether contact between animals probably has something to do with estrus can be improved by means of the above-mentioned method using a common temporal clock for all nodes. This is because it is then possible to also determine the propagation times of signals between the ear tags of two animals touching one another. Therefore, contact between the front region of one animal and the rear region of another animal—as is typical of estrus—can be distinguished from other contact between two animals.

EXAMPLE 5 (Bolus as a Node)

An animal ingests a bolus into its body by swallowing it. The bolus is a node 8 which respectively has a connection electrode on its outer side at two locations which are spaced apart as far as possible from one another. As long as the bolus is in the animal's body, AC voltage between the two connection electrodes generates a—very attenuated—signal at the ear tag 3. As soon as the bolus has been excreted by the animal, a signal cannot be determined at the ear tag 3. This makes it possible to monitor digestion activity. The bolus can also comprise various sensors and a data storage apparatus. After excretion from the animal, the bolus can be picked up and its data memory can be read.

EXAMPLE 6 (Assignment of Piglet to Sow)

After a sow provided with a BCC-enabled ear tag has given birth to piglets, they are provided with an ear tag which is BCC-enabled and has a unique identity signature. (Otherwise, the ear tags for piglets can have a more economical, more short-lived, smaller and simpler structure than the ear tags for breeding sows which need to be used for longer.) As explained using the estrus detection according to the above example 4, body contact of a piglet with a sow can therefore be detected and documented. Documentation is therefore also automatically created if a piglet is taken away from one sow and is passed to another sow arranged with its own litter in a different crate. (This is typically the case when two sows have farrowed litters of very different sizes at approximately the same time, with the result that one sow tends to be overloaded and the second sow more easily sustains an additional piglet.)

EXAMPLE 7 (Assignment of Sow to Farrowing Crate)

As soon as it becomes foreseeable that the farrowing date for a pregnant sow is approaching, the sow is moved to a farrowing crate specifically provided for this purpose. The sow is provided with a BCC-enabled ear tag having a unique identity signature, and one or more BCC-enabled nodes with a unique identity signature are also fitted in the farrowing crate, typically at the feeding station. The monitoring central data processing system can therefore automatically detect which sow is in which farrowing crate, which makes it very easy to find sows requiring care. If BCC-enabled nodes are fitted at a plurality of locations in the crate, the behavior of the sow can be automatically inferred in even more detail, with the result that the frequency of moving, lying down, eating etc. can be automatically detected and the starting time of the birthing process can therefore be readily detected.

In addition to the examples mentioned, there are certainly also a multiplicity of further applications according to the invention for the data network according to the invention, that is to say for monitoring voluntary behaviors of animals 1.

The important factor is that, for a behavior of the animal to be monitored, there is a location which is particularly preferably approached by the animal precisely then and that a node 8 is fitted at this location such that the described electronic communication between two nodes 8, 3, during which the animal's body is concomitantly included as an electrical conductor, can take place.

The data network which can be used according to the invention can also be used without restriction for the purpose already known from the prior art, that of logging contact of animals with medical devices and/or with persons who are carrying out the treatment and are equipped with a node of the data network during medical treatment of animals.

In a particularly advantageous further development, not only are data relating to approach and contact of animals wearing nodes with other animals or apparatuses also equipped with nodes measured and transmitted in the data network, but rather acceleration data are also measured and transmitted. For this purpose, an ear tag is typically equipped with an acceleration sensor (which ideally measures in a multidimensional manner) and the measured acceleration data are transmitted to the central data processing system by radio.

This makes it possible, in the event of contact between two cows which is motivated by estrus, to detect which of the two cows is the more passive animal and which is the more active animal. The measured acceleration values are lower in the time range of contact in the case of the more passive animal than in the case of the more active animal. The optimum time for inseminating a cow in estrus can therefore be detected very accurately because this is precisely when the cow adopts a passive phase after a more active phase and is happily touched by other cattle.

The invention claimed is:

1. A data network for automatically monitoring voluntary behaviors of individual animals in an animal herd, the data network having a plurality of nodes and a central data processing system, the plurality of nodes including a first node and a second node, each of the first and second nodes operating as a transmitter and a receiver in the data network and having a unique identification signature, the first node being fitted to a first animal to be monitored, the second node being fitted to a second animal which is approached or touched by the first animal during voluntary behaviors to be monitored, communication taking place electronically between the first and second nodes as soon as the first animal enters the vicinity of the second node, the first nodes, in the event of communication with the second node, transmitting the identification signature of the first node to the second node, and the second node, after having received the identification signature of the first node, transmitting the identification signatures of both the first and second nodes to the data processing system, wherein the first and second nodes each have two connection electrodes and are designed to communicate with one another by interchanging electrical signals in a closed electrical AC circuit that runs via first and second connection electrodes for each node and via the body of the first or second animal as the electrical conductor and runs via ground and via a capacitance between the first connection electrode of each node and the ground, and the second connection electrode of each node forming the contact with the body of the first or second animal in the circuit, and one of the first and second connection electrodes of each node being on the side of the first or second animal in the circuit and the second connection electrode of each node at least indirectly constituting the connection to ground.

2. The data network as claimed in claim 1, wherein each node is able to communicate with the data processing system by radio.

3. The data network as claimed in claim 1, wherein the plurality of nodes are synchronized in a common clock cycle in which times are stipulated in terms of when electrical signals are emitted from which node in the AC circuit concomitantly including the body of an animal.

4. The data network as claimed in claim 1, wherein the plurality of nodes includes a third node that is fitted to a cattle trough and the data processing system is used to control the drinking behavior of the animals and/or to control the use of the cattle trough.

5. The data network as claimed in claim 1, wherein the plurality of nodes includes a third node that is fitted to a feeding station and the data processing system is used to control the feeding behavior of the animals.

6. The data network as claimed in claim 1, wherein the plurality of nodes includes a third node that is fitted to a milking parlor and the data processing system is used to control the milking behavior of the animals.

7. The data network as claimed in claim 1, wherein the plurality of nodes includes a third node that is fitted to a teat cup of a milking robot and is used to document the contact between the teat cup and individual teats of an animal to be milked.

8. The data network as claimed in claim 1, wherein the data processing system controls the contact behavior between the animals according to whether the frequency of contact increases significantly at some times in comparison with other times and a message indicating that an animal is possibly in estrus is output.

9. The data network as claimed in claim 8, wherein the data processing system also processes acceleration data measured on the animals and the decision regarding whether estrus and/or an optimum insemination time is present is concomitantly influenced on the basis of the acceleration data.

10. The data network as claimed in claim 1, wherein a sow and piglets are each equipped with nodes and the data network is used to document that a piglet belongs to a sow.

11. The data network as claimed in claim 1, wherein the first node is fitted to a pregnant sow and one or more of the plurality of nodes are fitted in a farrowing crate which is intended to be a protected location for the sow for farrowing.

12. A data network for automatically monitoring voluntary behaviors of individual animals in an animal herd, the data network having a plurality of nodes and a central data processing system, the plurality of nodes including a first node and a second node, each of the first and second nodes operating as a transmitter and a receiver in the data network and having a unique identification signature, the first node being fitted to a first animal to be monitored, the second node being fitted to a second animal which is approached or touched by the first animal during voluntary behaviors to be monitored, communication taking place electronically between the first and second nodes as soon as the first animal enters the vicinity of the second node, the first node, in the event of communication with the second node, transmitting the identification signature of the first node to the second node, and the second node, after having received the identification signature of the first node, transmitting the identification signatures of both the first and second nodes to the data processing system, wherein the first and second nodes each have two connection electrodes and are designed to communicate with one another by interchanging electrical signals in a closed electrical AC circuit that runs via first and second connection electrodes for each node and via the body of the first or second animal as the electrical conductor and runs via ground and via a capacitance between a the first connection electrode of each node and the ground, and the second connection electrode of each node forming the contact with the body of the first or second animal in the circuit, and one of the first and second connection electrodes of each node being on the side of the first or second animal in the circuit and the second connection electrode of each node at least indirectly constituting the connection to ground, wherein the first and second nodes are synchronized in a common clock cycle in which times are stipulated in terms of when electrical signals are emitted from the first and second nodes.

13. A data network for automatically monitoring voluntary behaviors of individual animals in an animal herd, the data network having a plurality of nodes and a central data processing system, the plurality of nodes including a first node and a second node, each of the first and second nodes operating as a transmitter and a receiver in the data network and having a unique identification signature, the first node being fitted to a first animal to be monitored, the second node being fitted to a second animal which is approached or touched by the first animal during voluntary behaviors to be monitored, communication taking place electronically between the first and second nodes as soon as the first animal enters the vicinity of the second node, the first node, in the event of communication with the second node, transmitting the identification signature of the first node to the second node, and the second node, after having received the identification signature of the first node, transmitting the identification signatures of both the first and second nodes to the data processing system, wherein the first and second nodes each have two connection electrodes and are designed to communicate with one another by interchanging electrical signals in a closed electrical AC circuit that runs via first and second connection electrodes for each node and via the body of the first or second animal as the electrical conductor and runs via ground and via a capacitance between a the first connection electrode of each node and the ground, and the second connection electrode of each node forming the contact with the body of the first or second animal in the circuit, and one of the first and second connection electrodes of each node being on the side of the first or second animal in the circuit and the second connection electrode of each node at least indirectly constituting the connection to ground, wherein the data processing system controls the contact behavior between the first and second animals according to whether the frequency of contact increases significantly at some times in comparison with other times and a message indicating that the first animal is possibly in estrus is output.

14. The data network as claimed in claim 13, wherein the data processing system also processes acceleration data measured on the first and second animals and the decision regarding whether estrus is present is concomitantly influenced on the basis of the data acceleration data.

15. A data network for automatically monitoring voluntary behaviors of individual animals in an animal herd, the data network having a plurality of nodes and a central data processing system, the plurality of nodes including a first node and a second node, each of the first and second nodes operating as a transmitter and a receiver in the data network and having a unique identification signature, the first node being fitted to a piglet to be monitored, the second node being fitted to a sow which is approached or touched by the piglet during voluntary behaviors to be monitored, communication taking place electronically between the first and second nodes as soon as the piglet enters the vicinity of the sow, the first node, in the event of communication with the second node, transmitting the identification signature of the first node to the second node, and the second node, after having received the identification signature of the first node, transmitting the identification signatures of both the first and second nodes to the data processing system such that the data network is used to document that the piglet belongs to the sow, wherein the first and second nodes each have two connection electrodes and are designed to communicate with one another by interchanging electrical signals in a closed electrical AC circuit that runs via first and second connection electrodes for each node and via the body of the piglet or the sow as the electrical conductor and runs via ground and via a capacitance between a the first connection electrode of each node and the ground, and the second connection electrode of each node forming the contact with the body of the piglet or the sow in the circuit, and one of the first and second connection electrodes of each node being on the side of the piglet or the sow in the circuit and the second connection electrode of each node at least indirectly constituting the connection to ground.

* * * * *